United States Patent
Davazli

(10) Patent No.: US 11,933,371 B2
(45) Date of Patent: Mar. 19, 2024

(54) SLIP JOINT ASSEMBLY FOR A DRIVESHAFT

(71) Applicant: TIRSAN KARDAN SANAYI VE TICARET A.S., Manisa (TR)

(72) Inventor: Sebahattin Davazli, Manisa (TR)

(*) Notice: Subject to any disclaimer, the term of this patent is extended or adjusted under 35 U.S.C. 154(b) by 395 days.

(21) Appl. No.: 17/276,775

(22) PCT Filed: Jun. 22, 2019

(86) PCT No.: PCT/TR2019/050488
§ 371 (c)(1),
(2) Date: Mar. 16, 2021

(87) PCT Pub. No.: WO2020/060513
PCT Pub. Date: Mar. 23, 2020

(65) Prior Publication Data
US 2021/0348655 A1    Nov. 11, 2021

(30) Foreign Application Priority Data
Sep. 21, 2018 (TR) .................... 2018/13605

(51) Int. Cl.
*F16D 3/06* (2006.01)
*F16C 33/46* (2006.01)
*F16D 3/38* (2006.01)

(52) U.S. Cl.
CPC .......... *F16D 3/065* (2013.01); *F16C 33/4682* (2013.01); *F16D 3/387* (2013.01)

(58) Field of Classification Search
CPC ....... F16D 3/065; F16D 3/387; F16C 33/4682
USPC .......................................................... 464/167
See application file for complete search history.

(56) References Cited

U.S. PATENT DOCUMENTS

| | | |
|---|---|---|
| 3,205,029 A | 9/1965 | Greby |
| 5,893,647 A * | 4/1999 | Mochizuki .......... B29C 45/4407 |
| 6,761,503 B2 | 7/2004 | Breese |
| 7,018,299 B2 | 3/2006 | da Silva |
| 8,460,116 B1 * | 6/2013 | Smith ...................... F16C 3/035 |
| | | 464/167 |

(Continued)

FOREIGN PATENT DOCUMENTS

DE   102016216011   3/2018
EP   0 425 238 A1 * 5/1991 .................... 464/167

(Continued)

OTHER PUBLICATIONS

PCT/TR2019/050488, "International Search Report and Written Opinion", dated May 5, 2020, 7 pages.

(Continued)

*Primary Examiner* — Greg Binda
(74) *Attorney, Agent, or Firm* — Egbert, McDaniel & Swartz, PLLC

(57) ABSTRACT

A joint assembly for a driveshaft has a yoke stub with multiple channels in the direction of extension; and a tube sleeve having a recess aligned with a corresponding channel and telescopically engaged with a yoke stub. The driveshaft includes multiple rollers spaced apart from each other in such a way that providing axial movement between the channel and the corresponding recess to transmit torque and a cage extending between the rollers to secure them together.

5 Claims, 1 Drawing Sheet

(56) References Cited

U.S. PATENT DOCUMENTS

2002/0102036 A1  8/2002  Senger
2004/0245759 A1  12/2004 Yamada et al.

FOREIGN PATENT DOCUMENTS

EP     1078843     2/2001
GB      958115 A   5/1964

OTHER PUBLICATIONS

EP19861865.4, "Extended European Search Report", dated Apr. 25, 2022, 4 pages.
PCT/TR2019/050488, "International Preliminary Report on Patentability", dated Apr. 1, 2021, 6 pages.

* cited by examiner

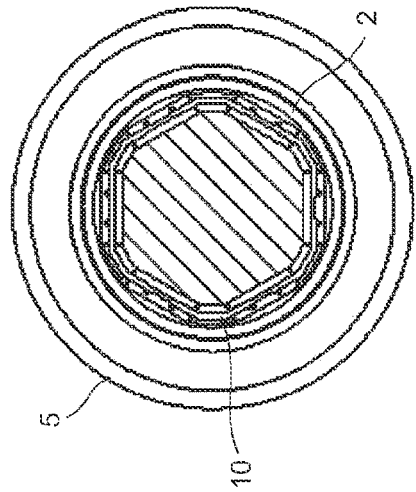
FIG. 2
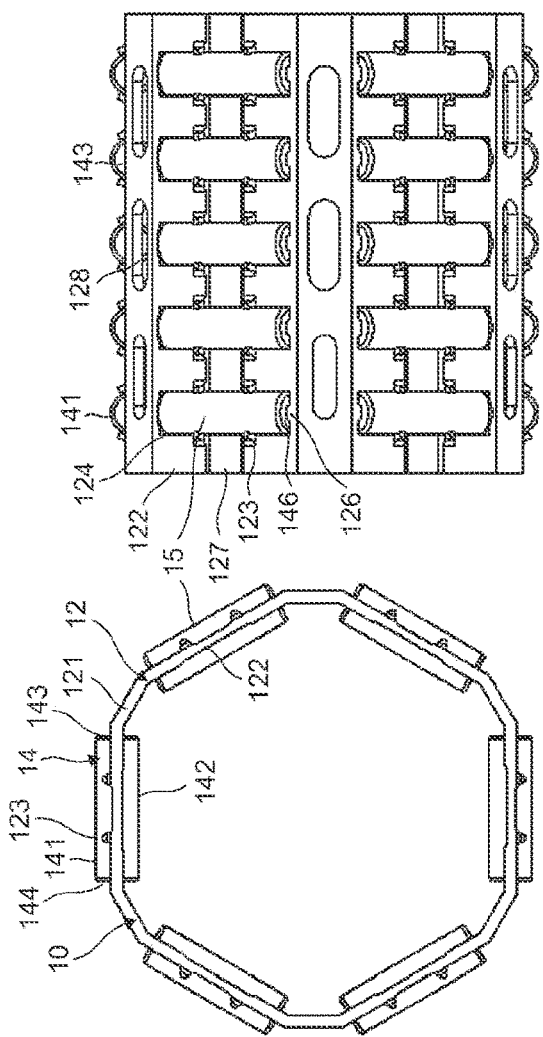
FIG. 5
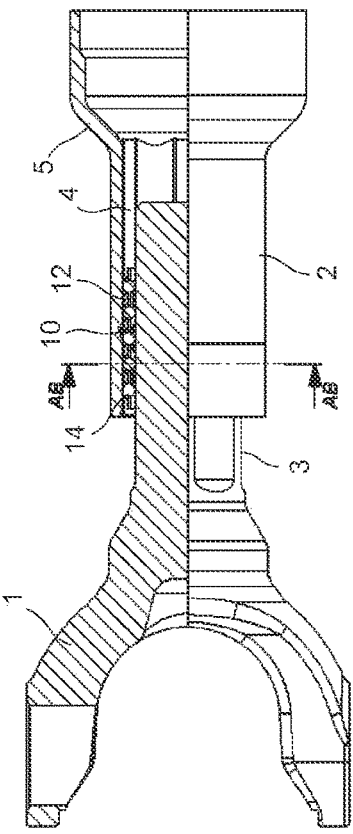
FIG. 1
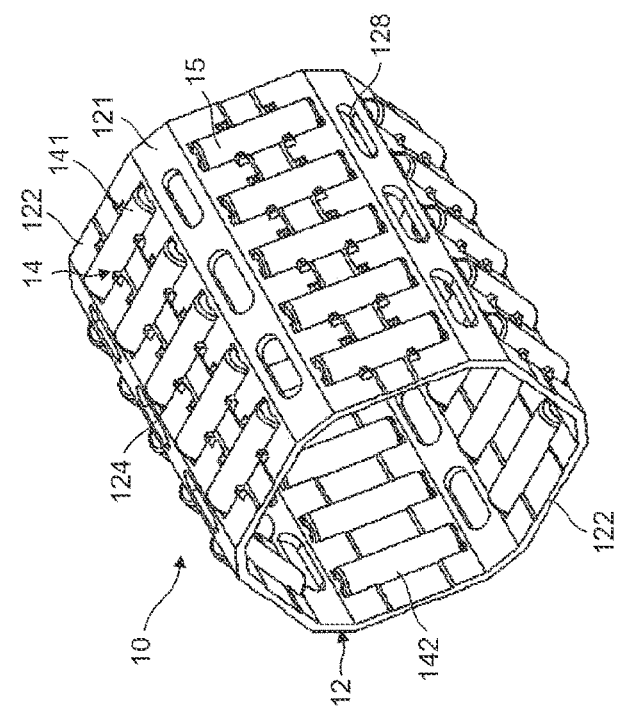
FIG. 4
FIG. 3

SLIP JOINT ASSEMBLY FOR A DRIVESHAFT

RELATED APPLICATIONS

This application is a U.S. National Phase of International Application No. PCT/TR2019/050488, filed Jun. 22, 2019, claiming priority to Turkish Patent Application No. 2018/13605, filed Sep. 21, 2018, contents of which are hereby incorporated by reference in their entirety.

TECHNICAL FIELD

The present invention relates to slip joints used in the transmission of torque or rotational force between axially moveable components in driveshafts.

In particular, the invention relates to slip joints having an improved cage structure which allows the slip elements to be held together.

PRIOR ART

In vehicles, transmission means are used to transmit rotational power from the engine or transmission assemblies to rotate one or more wheels. Driveshafts are commonly used drivetrain and some models have axial moving components. The axially movable components comprise a yoke stub and a tube sleeve with the aid of a slip joint.

U.S. Pat. No. 7,018,299 patent publication discloses a tube sleeve having a first and a second component for concurrent rotational movement and relative axial movement. The first component defines a longitudinal axis and has a first recess provided with an outer surface extending parallel to said axis. A second component defines a longitudinal axis and comprises an inner part and a second recess parallel to the axis. A plurality balls are disposed between the first and second recesses to connect the first and second components for co-rotating motion and relative axial motion. A helical-shaped cage extends between the first and second components to hold said balls apart.

In U.S. Pat. No. 6,761,503 patent publication, the cage is provided in a cylindrical body part. The cage is provided about the cylindrical body portion. The cage functions to retain the balls in a fixed relation to one another and limit the travel of the balls in the elongated grooves in the male member. The male member and the balls and cage supported by the male member are inserted into the female splined member so that the balls in each of the elongated grooves in the male member are disposed between two adjacent elongate rods.

BRIEF DESCRIPTION OF THE INVENTION

The object of the invention is to provide easy production of the slip joints that allow a limited amount of axial movement for the driveshaft system.

To achieve the aforementioned objective, invention comprises a yoke stub with multiple channels in the direction of extension; a tube sleeve is having a recess aligned corresponding channel and telescopically engaged with a yoke stub. A preferred embodiment of the invention comprises multiple rollers spaced apart from each other in such a way that providing axial movement between the channel and the corresponding recess to transmit torque and a cage extending between the rollers to secure them together. The roller have the freedom to move on one side the channel and on another side the corresponding groove, transfer the torque from one to the other by clutching the opposite lateral edges of the yoke stub to the channel and the recess respectively. The forces exerted to the yoke stub or the tube sleeve in the direction of elongation are eliminated by the telescopic movement formed by the roller moving in the channel and the recess. The channel and the recesses are distributed at circumferentially even intervals on the yoke stub and tube sleeve respectively.

In a preferred embodiment of the invention, the cage comprises a bearing plate having a bearing opening in which the rollers are arranged. The bearing plate allows a plurality of rollers to be mounted on the cage. In the preferred embodiment, the bearing opening may be in the form of a cut-out, as well as in other possible embodiments, in a different form in which each roller is received by a twist or a different path, or which delimits an area surrounding the roller.

In a preferred embodiment of the invention, the bearing plate is in flat form and extends at an angle with another bearing plate surrounded by the yoke stub at a vicinity of the corresponding bearing plate. The bearing plate fits easily into a thin space between the tube sleeve and the yoke stub and ensures a compact structure due to its flat form. The bearing plate together with the angled adjacent bearing plate at least partially surrounds the yoke stub. In a preferred embodiment, the angled adjacent bearing plates together form a closed geometry. This geometry fits to the outer periphery of the yoke stub.

A preferred embodiment of the invention comprises an edge plate extending at an angle between two bearing plates and connecting the bearing plates from opposite sides. The edge plate connects adjacent bearing plates carrying the rollers on each other, helping to form a ring-like form.

A preferred embodiment of the invention comprises a bearing opening that support tab pivoting the roller at opposite ends. The lugs hold the roller, for example by their opposite side edges, for rotating articulation on the bearing plate in the axis through which the lugs pass.

In a preferred embodiment of the invention, the support tab is integrated in the bearing plate. In this case, the support tab is obtained without a number of additional operations on the bearing plate, for example by drilling and cutting.

In a preferred embodiment of the invention, the rollers are in the form of cylinders extending transversely one after another. The cylindrical form not only provides a gripping surface that aids in torque transfer by the side edges, but also facilitates the axial sliding movement of the interlocking yoke stub and the tube sleeve. Alternatively, it is also possible to use rollers in the form of conical, barrel-like or different forms which are perpendicular to the axial direction, transversely elongated. In a preferred embodiment, the cylindrical forms have similar geometry and have a rotational axis in a same plane. In this case, all the rollers are provided to move between the yoke stub and the tube sleeve in the facing portions of each other during the feed.

In a preferred embodiment of the invention, the diameter of the roller is substantially equal to the distance between the recess and the channel in which the roller is located. Thus, when the bearing plate is placed between the yoke stub and the tube sleeve, each roller passes through the gap between the corresponding recess and channel, thereof providing effective torque transmission.

In a preferred embodiment of the invention, the cage comprises a flat cuff-like form. In this case, it takes up less space and increases the resistance in the direction of torque transmission.

BRIEF DESCRIPTION OF THE FIGURES

FIG. 1, is a partial cross-sectional illustration of a driveshaft using a representative embodiment of the slip joint assembly of the present invention.

FIG. 2, is a AB sectional illustration of the driveshaft shown in FIG. 1.

FIG. 3, is a front illustration of a representative embodiment of the slip joint assembly of the present invention.

FIG. 4, is a side view of the slip joint assembly shown in FIG. 3.

FIG. 5, is a top perspective illustration of the slip joint assembly shown in FIG. 3.

DETAILED DESCRIPTION OF THE INVENTION

In this detailed description, the intentive subject matter has been described with reference for examples, such that there is no restriction and only to better describe the subject matter.

In FIG. 1, the slip joint for the driveshaft according to the invention is shown with a partial-cross section from the front. The driveshaft for the vehicle transmits rotational power from an engine or transmission assembly (not shown) to the driven wheels. U.S. Pat. No. 7,018,299B2, incorporated herein by reference, schematically illustrates a transmission assembly of the type mentioned in FIG. 1.

A yoke stub (1) has a U-like yoke form at one end and a short shaft at the other end which provides an opposite extension (6). Yoke stub (1) is made integrally of a one-piece metal material. The cylindrical extension (6) of the yoke stub (1) engages axially into the gap of the tube sleeve (2). Elongated channel (3) structures are formed in circumferentially sequential on the extension (6). The recesses (4) are formed correspondingly to the channels (3) of a bushing (7) which is in the extension (6) of the tube sleeve (2). The lengths of the bushing (7) and the extension are approximately equal. The inner diameter of bushing (7) is bigger than the outer diameter of the extension (6) defining a gap therebetween. The distal end of the bushing (7) forms a tube part (5) by expanding conically. As shown in FIG. 2, a slip joint (10) is provided between the yoke stub (1) and the tube sleeve (2). The slip joint (10) comprises a cage (12) of a diagonal ring structure and a plurality of rollers (14) is arranged sequentially within the cage (12).

In FIG. 3, the slip joint (10) is shown from the front. The rollers (14) are cylindrical and in the same size. An upper part (141) and a lower part (142) are aligned in the same plane with the second roller (15) along the lateral width of each cylindrical roller (14). In lateral section, the cage (12) has a hexagonal prism structure which consists of bearing plates (122) interconnected by bearing plates (122). As shown in FIG. 4, each bearing plate (122) has a rectangular strip structure. The bearing openings (124) are formed on the front surface of the bearing plate (122) in the form of a cut-out, each of which is secured to a lateral end of a roller (14). The bearing opening (124) has a rectangular hole structure wounding the roller (14). The roller (14) is pivoted from the short sides of the bearing opening (124) of the bearing plate (122) with a pair of opposing support tabs (126) passing through the cross circular parts (144). The support tabs (126) extend from the part of the bearing plate (122) facing the bearing opening (124) in a short projection structure to the recess in the lateral part (143). Thus, the roller (14) rotates freely in a rotational axis from the opposing support tabs (126). The parallel identical cylindrical rollers (14), which are spaced apart from each other, are mounted to the corresponding bearing openings (124) by means of support tabs (126) at the lateral part (143) from the center of the circle. As it is, in FIG. 3, the distance between the upper part (141) and the bearing plate (122) and the distance between the lower part (142) and the bearing plate (122) are equal to each other. A lug (123) extending upwardly in pairs along the long edges of the bearing opening (124) makes is difficult to exit the roller (14) from the bearing opening (124) in rigid movements.

The slip joints (10) shown from perspective in FIG. 5, are shown to have holes (128) longitudinally seated in the edge plates (121) which connect the bearing plates (122) which want to be angled to each other as a flat bridge. The holes (128) provide relief of the cage (12) by discharge. Since each bearing plate (122) is connected to the adjacent bearing plates (122) along its long edges with the edge plate (121), the same number of bearing plates (122) are used as the edge plate (121). The cage (12) can be obtained by forming a cylindrical ring element into an angular shape by plastic molding to form bearing plates (122) and edge plates (121) by means of a mold or it can also be formed by securing the flat strips of equal length along the long edges by welding or other joining means.

In each bearing plate (122), the upper part (141) and the lower part (142) are engaged in the gap (space) between the corresponding channel (3) or the recess (4) of the roller (14) and the slip joint (10) becomes torque transmitting between the yoke stub (1) and the tube sleeve (2). Thus, when the driveshaft is connected to the motor or transmission assembly, the lateral array of rollers (14) travel on the channel (3) and the recess (4) in the direction of travel of the tube sleeve (2) in the coaxial axis with the yoke stub (1) respect to each other or in the opposite direction enabling telescopic movement of the yoke stub (1) and the tube sleeve (2) in an extensible and shorter manner. At the same time, during the engagement, the roller (14), regardless of its position on the channel (3) and the recess (4), makes it possible to transmit torque by leaning from the lateral part (143) to the corresponding channel (3) and recess (4).

REFERENCE NUMBERS

1 Yoke stub
2 Tube sleeve
3 Channel
4 Recess
5 Tube part
6 Extension
7 Bushing
10 Slip joint
12 Cage
121 Edge plate
122 Bearing plate
123 Lug
124 Bearing opening
126 Support tab
127 Support ridge
128 Hole
14 Roller
141 Upper part
142 Lower part
143 Lateral part
144 Cross lateral part
146 Bearing race
15 Second roller

The invention claimed is:

1. A joint assembly for a driveshaft comprising:
a yoke stub with multiple channels in the direction of extension;
a tube sleeve having a recess aligned with a corresponding channel and telescopically engaged with the yoke stub;
multiple rollers spaced apart from each other in such a way that provides axial movement between the channel and the corresponding recess to transmit torque; and
a cage extending between the rollers to secure them together,
wherein the cage comprises a bearing plate having a bearing opening in which a roller among the rollers is arranged,
wherein the bearing opening comprises a support tab pivoting the roller at opposite ends, and
wherein the cage has a hexagonal prism structure.

2. A joint assembly for a driveshaft comprising:
a yoke stub with multiple channels in the direction of extension;
a tube sleeve having a recess aligned with a corresponding channel and telescopically engaged with the yoke stub;
multiple rollers spaced apart from each other in such a way that provides axial movement between the channel and the corresponding recess to transmit torque; and
a cage extending between the rollers to secure them together,
wherein the cage comprises a bearing plate having a bearing opening in which a roller among the rollers is arranged,
wherein the bearing opening comprises a support tab pivoting the roller at opposite ends, and
wherein the bearing plate is in flat form and extends at an angle with another bearing plate, an edge plate extending at an angle between two bearing plates and connecting the bearing plates from opposite sides.

3. The joint assembly according to claim 2, wherein the support tab extends from a part of the bearing plate facing the bearing opening.

4. The joint assembly according to claim 2, wherein the rollers are in the form of cylinders extending transversely one after another.

5. The joint assembly according to claim 2, wherein the cage has a hexagonal prism structure.

* * * * *